United States Patent
Hueber et al.

(10) Patent No.: US 10,720,967 B2
(45) Date of Patent: Jul. 21, 2020

(54) METHOD AND SYSTEM FOR OPERATING A COMMUNICATIONS DEVICE THAT COMMUNICATES VIA INDUCTIVE COUPLING

(71) Applicant: NXP B.V., Eindhoven (NL)

(72) Inventors: Gernot Hueber, Linz (AT); Erich Merlin, Gratkorn (AT); Johannes Bruckbauer, Treubach (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/715,027

(22) Filed: Sep. 25, 2017

(65) Prior Publication Data

US 2019/0097687 A1 Mar. 28, 2019

(51) Int. Cl.
| | | |
|---|---|---|
| H04B 5/00 | (2006.01) | |
| H04B 17/21 | (2015.01) | |
| H04B 17/11 | (2015.01) | |

(52) U.S. Cl.
CPC ......... H04B 5/0075 (2013.01); H04B 5/0031 (2013.01); H04B 17/11 (2015.01); H04B 17/21 (2015.01)

(58) Field of Classification Search
CPC ..................................................... H04B 5/00
See application file for complete search history.

(56) References Cited

U.S. PATENT DOCUMENTS

| | | |
|---|---|---|
| 5,703,573 A | 12/1997 | Fujimoto et al. |
| 6,760,434 B1 | 7/2004 | Rezvani et al. |
| 6,799,015 B1 | 9/2004 | Tiwari |
| 7,200,375 B2 | 4/2007 | Kottschlag et al. |
| 7,268,644 B2 | 9/2007 | Kottschlag et al. |
| 7,295,594 B1* | 11/2007 | Lohr ............... H04B 15/04 375/130 |
| 7,577,205 B1 | 8/2009 | Liu |
| 8,013,600 B1* | 9/2011 | Yepez, III .......... G01N 27/9033 324/240 |
| 8,279,018 B1 | 10/2012 | Song et al. |
| 8,817,184 B1* | 8/2014 | Amirkhany .............. H04N 5/04 348/194 |
| 8,848,932 B2* | 9/2014 | Poulsen ................. H03G 3/301 381/104 |

(Continued)

FOREIGN PATENT DOCUMENTS

| | | |
|---|---|---|
| EP | 2395673 A2 | 12/2011 |
| EP | 2752999 A1 | 9/2014 |

OTHER PUBLICATIONS

European Search Report, 17198699, dated Apr. 26, 2018.
(Continued)

*Primary Examiner* — Cindy Trandai

(57) ABSTRACT

Embodiments of methods and systems for operating a communications device that communicates via inductive coupling are described. In an embodiment, a method for operating a communications device that communicates via inductive coupling involves adjusting a configuration of the communications device in response to a clock signal that is synchronized to a received clock signal, obtaining information that corresponds to transmission current or power generated in response to the adjusted configuration, and quantifying a detuning condition in response to the obtained information. Other embodiments are also described.

20 Claims, 10 Drawing Sheets

(56) References Cited

U.S. PATENT DOCUMENTS

| | | |
|---|---|---|
| 8,964,605 B1 | 2/2015 | Ansari |
| 9,083,441 B2 | 7/2015 | Sahota et al. |
| 9,293,797 B2 | 3/2016 | Kim et al. |
| 9,727,812 B2 | 8/2017 | Forster |
| 9,960,735 B1 | 5/2018 | Ding et al. |
| 9,985,732 B2 | 5/2018 | Cordier |
| 10,153,644 B2* | 12/2018 | DeVaul ............... H04W 76/14 |
| 2002/0097144 A1* | 7/2002 | Collins ............... G06F 1/3203 340/333 |
| 2004/0135622 A1 | 7/2004 | Masleid et al. |
| 2004/0174185 A1* | 9/2004 | Lin ................ H03K 19/0005 326/30 |
| 2005/0232300 A1 | 10/2005 | Stiscia et al. |
| 2005/0259764 A1* | 11/2005 | Hung Lai ........ H03K 3/356043 375/317 |
| 2006/0132362 A1 | 6/2006 | Yuanzhu |
| 2007/0293168 A1 | 12/2007 | Kottschlag et al. |
| 2008/0186105 A1 | 8/2008 | Scuderi et al. |
| 2008/0238679 A1 | 10/2008 | Rofougaran et al. |
| 2010/0148929 A1 | 6/2010 | Wu et al. |
| 2010/0237709 A1* | 9/2010 | Hall ................ B60L 53/52 307/104 |
| 2010/0273441 A1 | 10/2010 | Dubash et al. |
| 2011/0065398 A1* | 3/2011 | Liu ................ H02J 5/005 455/127.1 |
| 2011/0068636 A1 | 3/2011 | Lee et al. |
| 2011/0300800 A1 | 12/2011 | Wuidart |
| 2012/0056718 A1* | 3/2012 | Leutgeb ............ G06K 19/0712 340/10.1 |
| 2012/0092901 A1 | 4/2012 | Wuidart |
| 2012/0094610 A1* | 4/2012 | Lunden ............... H04W 16/14 455/67.13 |
| 2012/0122461 A1 | 5/2012 | Hossain et al. |
| 2012/0152938 A1* | 6/2012 | Nordh ................. H05B 6/705 219/702 |
| 2012/0153732 A1 | 6/2012 | Kurs et al. |
| 2012/0153835 A1 | 6/2012 | Su et al. |
| 2013/0099587 A1* | 4/2013 | Lou ................ H02J 50/12 307/104 |
| 2013/0109330 A1 | 5/2013 | Sahota et al. |
| 2013/0258911 A1 | 10/2013 | Choksi |
| 2013/0271342 A1 | 10/2013 | Shen |
| 2013/0272044 A1* | 10/2013 | Boys ................ H02J 5/005 363/126 |
| 2013/0328734 A1* | 12/2013 | Thind ............... H03H 7/40 343/745 |
| 2014/0015330 A1* | 1/2014 | Byun ................ H02J 5/005 307/104 |
| 2014/0044293 A1 | 2/2014 | Ganem et al. |
| 2014/0050124 A1 | 2/2014 | Yang et al. |
| 2014/0073243 A1 | 3/2014 | Hijioka et al. |
| 2014/0080409 A1* | 3/2014 | Frankland ............ H02J 5/005 455/41.1 |
| 2014/0101747 A1* | 4/2014 | Lu ................ H04W 12/06 726/9 |
| 2014/0111023 A1 | 4/2014 | Kagami et al. |
| 2014/0142436 A1* | 5/2014 | Hutchins ............ A61B 5/0035 600/478 |
| 2014/0240057 A1* | 8/2014 | Low ................ H04B 5/0037 333/32 |
| 2014/0241556 A1 | 8/2014 | Larsen et al. |
| 2014/0306780 A1 | 10/2014 | Lehtinen |
| 2015/0022145 A1* | 1/2015 | Kim ................ H02J 17/00 320/108 |
| 2015/0054453 A1* | 2/2015 | White, II ............ H04B 5/0075 320/108 |
| 2015/0061404 A1 | 3/2015 | Lamenza et al. |
| 2015/0065065 A1 | 3/2015 | Rofougaran et al. |
| 2015/0079903 A1 | 3/2015 | Song et al. |
| 2015/0171919 A1 | 6/2015 | Ballantyne et al. |
| 2015/0215937 A1 | 7/2015 | Khandani |
| 2015/0270719 A1* | 9/2015 | Kurs ................ H02J 5/005 320/108 |
| 2015/0270876 A1 | 9/2015 | Kim et al. |
| 2015/0280443 A1* | 10/2015 | Vladan ................ H03F 1/0294 307/104 |
| 2015/0280444 A1 | 10/2015 | Smith et al. |
| 2015/0303997 A1 | 10/2015 | Dhayni |
| 2016/0100312 A1* | 4/2016 | Bell ................ H02J 50/20 455/411 |
| 2016/0112146 A1 | 4/2016 | Lau et al. |
| 2016/0142109 A1 | 5/2016 | Kumar et al. |
| 2016/0172890 A1* | 6/2016 | Jeong ................ H02J 7/04 320/108 |
| 2016/0174267 A1 | 6/2016 | Mofidi et al. |
| 2016/0197510 A1 | 7/2016 | Stommer et al. |
| 2016/0294227 A1 | 10/2016 | Podkamien et al. |
| 2016/0365737 A1* | 12/2016 | Vladan ................ H02J 5/005 |
| 2017/0001003 A1 | 1/2017 | Pivonka et al. |
| 2017/0005533 A1* | 1/2017 | Zeine ................ H02J 50/80 |
| 2017/0012590 A1* | 1/2017 | Fong ................ H03G 3/3042 |
| 2017/0093168 A1 | 3/2017 | Von Novak, III et al. |
| 2017/0104468 A1 | 4/2017 | Kormann et al. |
| 2017/0110796 A1 | 4/2017 | Rokhsaz et al. |
| 2017/0141620 A1* | 5/2017 | Zeine ................ H02J 50/20 |
| 2017/0205481 A1* | 7/2017 | Kim ................ G01R 33/3628 |
| 2017/0230204 A1 | 8/2017 | Sivertsen |
| 2017/0264322 A1 | 9/2017 | Greene et al. |
| 2017/0270323 A1 | 9/2017 | Butler et al. |
| 2017/0310346 A1* | 10/2017 | White ................ H04B 1/0458 |
| 2017/0373541 A1* | 12/2017 | Shimokawa ............ H02J 50/12 |
| 2018/0040953 A1* | 2/2018 | Gebhart ................ H01Q 1/2291 |
| 2018/0054086 A1* | 2/2018 | Jung ................ H02J 50/10 |
| 2018/0102151 A1* | 4/2018 | Kim ................ G11C 7/222 |
| 2018/0176711 A1 | 6/2018 | Hueber et al. |
| 2018/0176712 A1 | 6/2018 | Hueber et al. |
| 2019/0097688 A1 | 3/2019 | Hueber et al. |

OTHER PUBLICATIONS

European Search Report, 17199033, dated May 3, 2018.
Notice of Allowance for U.S. Appl. No. 15/715,044 dated May 13, 2019, 14 pages.
E. Sartori, "Hybrid Transformers," IEEE Transactions on Parts, Materials and Packaging, vol. PMP-4, No. 3, Sep. 1968.
S. Abdelhalem, et al., "Hybrid Transformer-Based Tuneable Differential Duplexer in a 90-nm CMOS Process", IEEE Transactions on Microwave Theory and Techniques, vol. 61, No. 3, Mar. 2013.
Office action for related U.S. Appl. No. 15/383,382 (dated May 23, 2017).
Office action for related U.S. Appl. No. 15/383,382 (dated Oct. 20, 2017).
Office action for related U.S. Appl. No. 15/383,382 (dated Apr. 13, 2018).
Office action for related U.S. Appl. No. 15/383,382 (dated Oct. 9, 2018).
Office action for related U.S. Appl. No. 15/383,406 (dated Nov. 17, 2017).
Office action for related U.S. Appl. No. 15/383,406 (dated May 23, 2018).
Office action for related U.S. Appl. No. 15/383,406 (dated Sep. 5, 2018).
Office action for related U.S. Appl. No. 15/383,406 (dated Feb. 13, 2019).
Office action for related U.S. Appl. No. 15/715,044 (dated Jul. 6, 2018).
Notice of Allowance for related U.S. Appl. No. 15/715,044 (dated Jan. 24, 2019).
Notice of Allowance for related U.S. Appl. No. 15/715,044 (dated Apr. 3, 2019), 13 pages.
"Circulators and Isolators, unique passive devices—Application Note—AN98035", Philips Semiconductors, 31 pgs., retrieved from the internet Mar. 19, 2019 at: http://f6csx.free.fr/techni/CIRCU/Circulateurs2.pdf (Mar. 1998).
Langwieser, R. et al. "A Modular UHF Reader Frontend for a Flexible RFID Testbed", Institute of Communiciations and Radio-Frequency Engineering, Vienna University of Technology, 12 pgs,

(56) References Cited

OTHER PUBLICATIONS retrieved from the internet Mar. 19, 2019 at: https://www.eurasip.org/Proceedings/Ext/RFID2008/modular_UHF.pdf. (2008).

Reiskarimian, N. et al. "Magnetic-free non-reciprocity based on staggered commutation", Nature Communications, 10 pgs., retrieved from the internet at: https://www.nature.com/articles/ncomms11217.pdf (Apr. 2016).

Notice of Allowance for U.S. Appl. No. 15/383,406 dated May 16, 2019, 24 pages.

Office action for related U.S. Appl. No. 15/383,382 (dated Nov. 4, 2019).

Notice of Allowance dated Mar. 12, 20202 in U.S. Appl. No. 15/383,382.

* cited by examiner

METHOD AND SYSTEM FOR OPERATING A COMMUNICATIONS DEVICE THAT COMMUNICATES VIA INDUCTIVE COUPLING

Communications devices can communicate with each other via inductive coupling. For example, near field communications (NFC) is a wireless technology based on radio frequency identification (RFID). NFC defines a wireless connection between two devices in close proximity to each other to exchange data between the two devices. For example, the data communications between a reader and a transponder typically are bi-directional and initiated by the reader, which generates a continuous magnetic field. RFID devices that utilize NFC typically can be configured for either passive load modulation (PLM) or active load modulation (ALM).

In a communications device that communicates via inductive coupling, a detuning condition, which indicates a communications performance of the communications device with respect to a corresponding counterpart communications device, can affect the performance of the communications device. For example, a detuning condition can affect power transfer, shift characteristics (e.g., resonant frequency and Q-factor) of a matching network of the communications device, and the load of the transmitter. However, a typical communications device that communicates via inductive coupling generally does not have a built-in ability to detect the detuning condition.

SUMMARY

Embodiments of methods and systems for operating a communications device that communicates via inductive coupling are described. In an embodiment, a method for operating a communications device that communicates via inductive coupling involves adjusting a configuration of the communications device in response to a clock signal that is synchronized to a received clock signal, obtaining information that corresponds to transmission current or power generated in response to the adjusted configuration, and quantifying a detuning condition in response to the obtained information. Other embodiments are also described.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
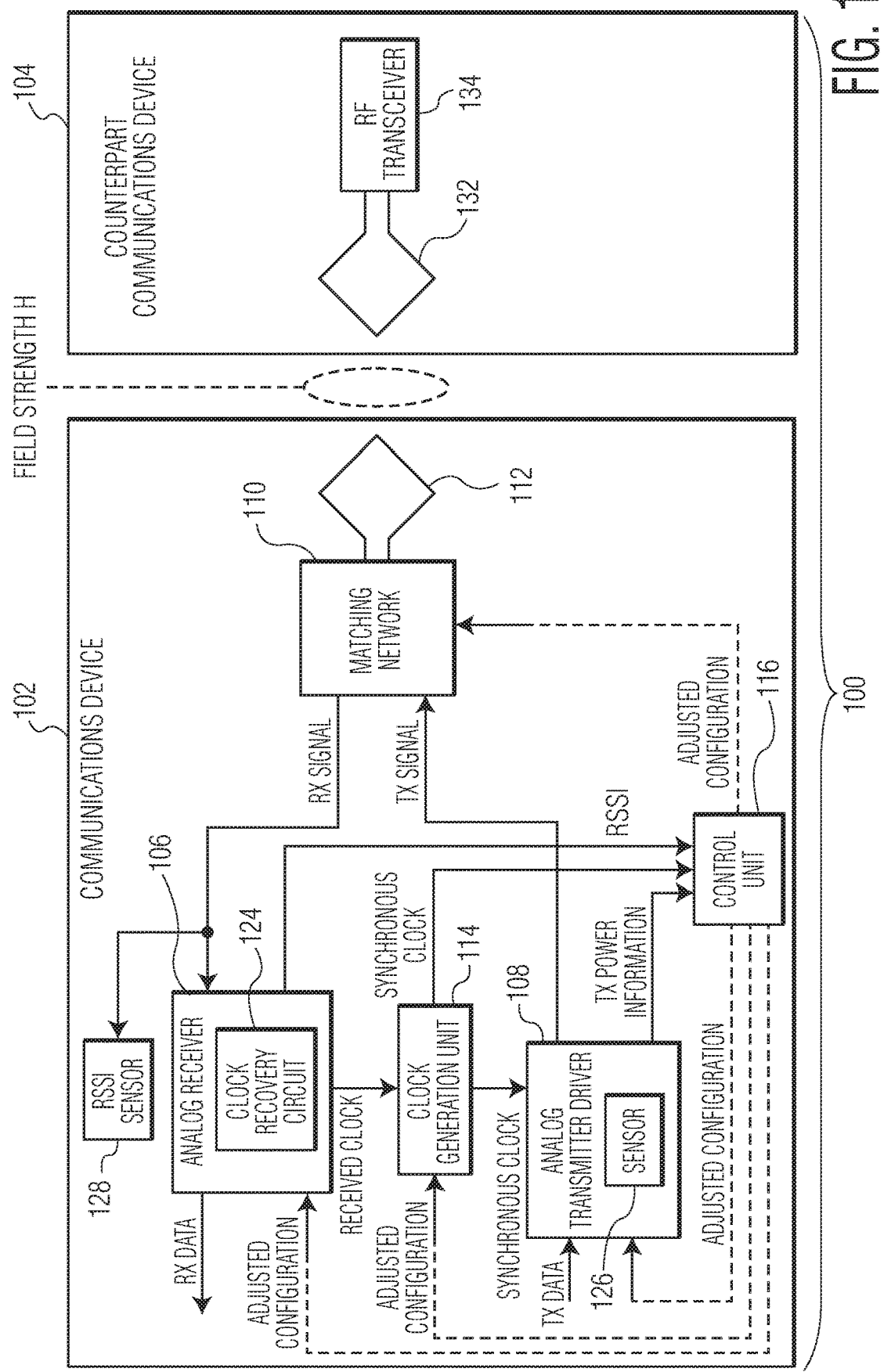
FIG. 1 depicts an embodiment of a communications device that can be used with a counterpart communications device to form an inductively coupled communications system.

FIG. 1 depicts an embodiment of a communications device 102 that can be used with a counterpart communications device 104 to form an inductively coupled communications system 100. In the inductively coupled communications system depicted in FIG. 1, the communications device 102 communicates with the counterpart communications device 104 via inductive coupling with a field strength, H. In some embodiments, the communications device 102 is a card/transponder device or the communications device 102 is in a "card-mode" in which the communications device 102 behaves as a card/transponder device and the counterpart communications device 104 is a dedicated reader device or a communications device in "reader-mode" in which the counterpart communications device 104 behaves as a reader device. In some other embodiments, the communications device 102 is a reader device or the communications device is in a reader mode and the counterpart communications device 104 is a dedicated card device or a communications device in card-mode.

In the embodiment depicted in FIG. 1, the communications device 102 includes an analog receiver 106, an analog transmitter driver 108, a matching network 110 that is coupled to an antenna 112, a clock generation circuit 114, and a control unit 116. In an example operation of the communications device, an RF signal (e.g., an RX signal) is received by the antenna via inductive coupling from an antenna 132 of the counterpart communications device 104 and is passed to the analog receiver to convert the RF signal into a digital signal (e.g., RX data), which can be further processed by a digital processor. A signal (e.g., TX data) may be generated in response to the RF signal (e.g., by a digital processor) and is used to produce an outgoing RF signal (e.g., a TX signal) at the analog transmitter driver. The TX signal may be transmitted to the counterpart communications device via inductive coupling using the antenna 112. The antenna 112 may be an induction type antenna such as a loop antenna or any other suitable type of induction type antenna. The communications device 102 may be fully or partially implemented as an integrated circuit (IC) device. In some embodiments, the communications device 102 is a handheld computing system or a mobile computing system, such as a mobile phone, which includes all elements shown in FIG. 2. The communications device 102 may be a near field communications (NFC) device that utilizes inductive coupling to communicate. In some embodiments, the communications device 102 is implemented as an RF transponder that is compatible with the International Organization for Standardization (ISO)/the International Electrotechnical Commission (IEC) 14443 standard. Although the illustrated communications device 102 is shown with certain components and described with certain functionality herein, other embodiments of the communications device 102 may include fewer or more components to implement the same, less, or more functionality. In some embodiments, the communications device 102 is an active load modulation (ALM) device. In such embodiments, the communications device 102 can be configured to generate its own magnetic field for transmitting an outgoing RF signal using a current source, such as a battery, which results in greater communications distances compared to passive load modulation (PLM) systems. In some embodiments, the communications device includes a low-dropout regulator (LDO) or other type of supply regulator (e.g., a DC-to-DC converter) that is configured to generate a supply voltage for the analog transmitter driver.

In the embodiment depicted in FIG. 1, the counterpart communications device 104 includes the antenna 132 and an RF transceiver 134 configured to receive incoming RF signals from the antenna 132 and to transmit outgoing RF signals through the antenna 132. In some embodiments, the RF transceiver includes an analog transmitter driver, a matching network, and/or an analog transmitter driver that are similar to or the same as the analog transmitter driver 108, the matching network 110, and/or the analog transmitter driver 108 of the communications device 102.

Referring back to the communications device 102, in some embodiments, the clock generation circuit 114 is configured to generate a clock signal for the analog transmitter driver 108. In an embodiment, the clock generation circuit generates a clock signal that is synchronized to a received clock signal. In some embodiments, the analog receiver 106 includes a clock recovery circuit 124 configured to generate a received clock signal based on an RF signal received by the antenna 112 via inductive coupling from the antenna 132 of the counterpart communications device 104.

A detuning condition in the inductively coupled communications system 100 can affect multiple factors that have an effect on the system performance of the inductively coupled communications system. For example, a detuning condition can affect the load on the antenna 112 of the communications device 102 and hence the load on the analog transmitter driver 108. For a strongly detuned communications system, the load on the transmitter driver can be relatively low (e.g., lowered by 10 dB). Consequently, the current for the voltage controlled transmitter driver can increase, which will increase the driver current and power dissipation. A detuning condition can also affect the load on the analog receiver 106. For example, in the event of an increase in power at the matching network 110, the receiver might get overloaded and/or the receiver signal budget can change. A detuning condition can also affect the phase configuration of the communications device. For example, due to the change in the inductively coupled communications system caused by the detuning condition, the phase relation caused by the matching networks and antennas of the communications device and the counterpart communications device 104 can change. For phase sensitive communication (e.g., ALM in FeliCa network, EMVCo LMA), a detuning condition can negatively affect the load modulation amplitude (LMA) performance. A detuning condition can also affect the frequency response of the inductively coupled communications system. For example, a detuning condition can impact the frequency response (resonant frequency, Q-factor) of the antenna/matching network of the communications device and the counterpart communications device and consequently, affect the transferred signal (amplitude and phase) in both communication directions. A detuning condition in the inductively coupled communications system may be critical for platforms with small antennas such as wearable devices and/or platforms with significant metal content in which communication or power transfer performance can be relatively low even under normal (non-detuned) conditions.

Referring to the communications device 102, the control unit 116 is configured to quantify a detuning condition (such as a transmitter (TX) detuning condition and/or a receiver (RX) detuning condition) in the inductively coupled communications system 100. A detuning condition related to the communications device 102 indicates a communications performance of the communications device 102 with respect to the corresponding counterpart communications device 104. In some embodiments, the transmitter detuning condition is defined as a ratio between the actual transmitter impedance (with the counterpart communications device 104 in close proximity to the communications device 102) and the nominal transmitter impedance (without a corresponding communications device in close proximity to the communications device). The transmitter detuning condition can be quantified by the control unit based on transmitter (TX) power (e.g., transmitter (TX) voltage and/or transmitter (TX) current) during a transmitter operation. In some embodiments, the transmitter power information is assessed based on the transmitter voltage level that can be determined by the analog transmitter driver 108, a voltage supply circuit for the analog transmitter driver, and/or the control unit. The transmitter current may be quantified by a current monitor, a voltage supply circuit for the analog transmitter driver, and/or the control unit. In some embodiments, the receiver detuning condition is defined as a ratio of actual receiver gain (from reader source field to target receiver input) when the counterpart communications device is in close proximity to the communications device 102 versus a nominal receiver gain (from reader source field to target receiver input) when the counterpart communications device is not in close proximity to the communications device. The control unit may be implemented as hardware, software, firmware, and/or a combination of hardware, software, and/or firmware. In some embodiments, the control unit is implemented as a processor such as a microcontroller or a central processing unit (CPU).

A detuning condition related to the communications device 102 may not be accurately quantified under a single configuration of the communications device. Under a certain phase configuration or a certain amplitude and/or power configuration, it may be sufficient to use one or more typical system parameters to quantify a detuning condition related to the communications device. For example, under a particular phase configuration, it may be sufficient to use a received signal strength indicator (RSSI) to quantify a detuning condition because the RSSI may be identical for different distances between the communications device and the counterpart communications device 104. In some embodiments, the control unit 116 is configured to adjust a configuration of the communications device in response to the clock signal from the clock generation circuit 114, to obtain information that corresponds to transmission current or power generated in response to the adjusted configuration, and to quantify a detuning condition in response to the obtained information. By adjusting the configuration of the communications device and quantifying a detuning condition in response to information that corresponds to transmission current or power generated in response to the adjusted configuration, the control unit can quantify the detuning condition more accurately. The clock signal from the clock generation circuit may be synchronized to a received clock signal from the counterpart communications device 104. In an embodiment, the received clock signal is a clock signal that is generated by the clock recovery circuit 124 based on an RF signal received by the antenna 112 from the counterpart communications device.

In some embodiments, the control unit 116 is configured to quantify a detuning condition related to the communications device 102 under different configurations of the communications device. For example, the control unit may quantify a first detuning condition in response to information that corresponds to transmission current or power generated in response to a first configuration of the communications device, adjust the first configuration of the communications device into a second configuration in response to the clock signal from the clock generation circuit 114, obtain information that corresponds to transmission current or power generated in response to the second configuration, and quantify a second detuning condition in response to the obtained information. In some embodiments, the control unit detects a change in a detuning condition related to the communications device.

The communications device 102 can perform various operations in response to the quantified detuning condition. In some embodiments, the control unit 116 adjusts a transmitter configuration of the communications device 102 in response to a detuning condition. For example, the control unit can adjust a transmitter modulation configuration of the communications device, a transmitter impedance configuration of the communications device, and/or a transmitter output power configuration of the communications device to compensate for a detuning condition to improve the overall system performance of the communications device. Consequently, the overall inductive coupling based communications performance of the communications device can be improved.

Figure 2:
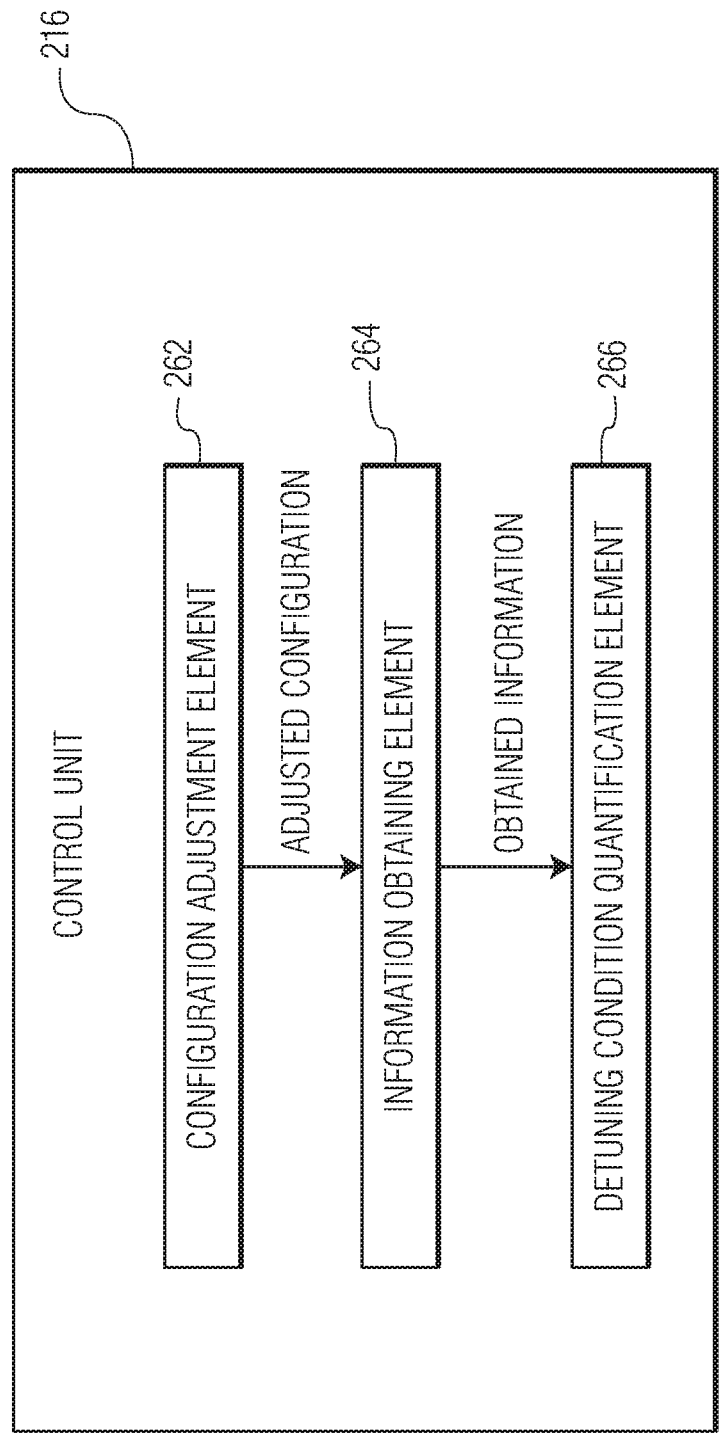
FIG. 2 depicts an embodiment of a control unit of the communications device depicted in FIG. 1.

FIG. 2 depicts an embodiment of the control unit 116 of the communications device 102 depicted in FIG. 1. In the embodiment of FIG. 2, a control unit 216 includes a configuration adjustment element 262, an information obtaining element 264, and a detuning condition quantification element 266. In some embodiments, the configuration adjustment element is configured to adjust a configuration of the communications device in response to a clock signal that is synchronized to a received clock signal, the information obtaining element is configured to obtain information that corresponds to transmission current or power generated in response to the adjusted configuration, and the detuning condition quantification element is configured to quantify a detuning condition in response to the obtained information. The clock signal may be a clock signal from the clock generation circuit 114, which is synchronized to a received clock signal from the counterpart communications device 104. Each of the configuration adjustment element, the information obtaining element, and the detuning condition quantification element may be implemented as hardware, software, firmware, and/or a combination of hardware, software, and/or firmware. In some embodiments, at least one of the configuration adjustment element, the information obtaining element, and the detuning condition quantification element is implemented as a processor such as a microcontroller or a central processing unit (CPU). The control unit 216 depicted in FIG. 2 is a possible implementation of the control unit 116 depicted in FIG. 1. However, the control unit depicted in FIG. 1 can be implemented differently from the control unit depicted in FIG. 2.

In some embodiments, the configuration of the communications device 102 includes at least one of a phase configuration of the communications device and an amplitude and/or power configuration of the communications device 102. In these embodiments, the configuration adjustment element 262 adjusts at least one of a phase configuration of the communications device and an amplitude and/or power configuration of the communications device in response to the clock signal from the clock generation circuit 114. In an embodiment, the configuration adjustment element sweeps the phase configuration of the communications device by adjusting the phase configuration of the communications device from one threshold to another threshold. For example, the configuration adjustment element sweeps the phase relation between the carrier phase and the transmission phase (e.g., the phase relation between the analog transmitter driver 108 of the communications device 102 and the counterpart communications device) from one threshold to another threshold. In another embodiment, the configuration adjustment element sweeps the amplitude and/ or power configuration of the communications device by adjusting the amplitude configuration of the communications device from one threshold to another threshold. For example, the configuration adjustment element sweeps the transmission amplitude by adjusting a transmission signal amplitude (e.g., a transmission signal that is output from the analog transmitter driver) from one threshold to another threshold. In another example, the configuration adjustment element sweeps the transmission power by adjusting transmission signal power (e.g., a transmission signal that is output from the analog transmitter driver) from one threshold to another threshold. The configuration adjustment element may be implemented as hardware, software, firmware, and/or a combination of hardware, software, and/or firmware. In some embodiments, the configuration adjustment element is implemented as a processor such as a microcontroller or a CPU.

In some embodiments, the information obtained by the information obtaining element 264 includes at least one of transmission current information, transmission voltage information, transmission power information, and received signal strength information. In these embodiments, the detuning condition quantification element 266 quantifies a detuning condition in response to at least one of transmission current information, transmission voltage information, transmission power information, and received signal strength information. In an embodiment, the detuning condition quantification element 266 quantifies a detuning condition based on the received signal strength information and at least one of the transmission current information, the transmission voltage information, and the transmission power information.

In some embodiments, the communications device 102 includes at least one sensor 126, for example, a voltage sensor or a current sensor, to obtain transmission output power information related to the communications device. The transmission output power information can be used to derive/quantify a transmitter (TX) detuning condition related to the communications device. The transmission output power information may include a transmitter voltage within the communications device and/or a transmitter current within the communications device. Although the sensor is shown in FIG. 1 as being integrated within the analog transmitter driver 108, in other embodiments, the sensor may be separate from the analog transmitter driver. In some embodiments, the detuning condition quantification element 266 quantifies a transmitter detuning condition related to the communications device 102 based on transmission output power information related to the communications device. In an embodiment, the detuning condition quantification element generates a ratio between a transmitter impedance when the counterpart communications device 104 (e.g., a reader device or a card/tag device) is in close proximity to the communications device (e.g., when the counterpart communications device is within the NFC communications range (e.g., 20 centimeters or any other suitable distance) of the communications device) and a nominal transmitter impedance when there is not a corresponding communications device in close proximity to the communications device (e.g., when the counterpart communications device is out of the NFC communications range (e.g., 20 centimeters or any other suitable distance) of the communications device). For example, the detuning condition quantification element generates a ratio between a transmitter impedance when the counterpart communications device is within a predefined communications range of the communications device and a nominal transmitter impedance when there is no corresponding communications device within, for example, at least 10 times of the predefined communications range. The detuning condition quantification element may be implemented as hardware, software, firmware, and/or a combination of hardware, software, and/or firmware. In some embodiments, the detuning condition quantification element is implemented as a processor such as a microcontroller or a CPU.

In some embodiments, the communications device 102 includes a RSSI sensor 128 configured to quantify the signal amplitude of the received RF signal at the communications device to generate an RSSI value. The RSSI value can be used to derive a receiver (RX) detuning condition related to the communications device. Although the RSSI sensor is shown in FIG. 1 as being separate from the analog receiver 106, in other embodiments, the RSSI sensor may be integrated within the analog receiver. The detuning condition quantification element 266 may quantify a receiver detuning condition related to the communications device based on the RSSI at the communications device. In an embodiment, the detuning condition quantification element generates a ratio between a receiver gain when the counterpart communications device is in close proximity to the communications device (e.g., when the counterpart communications device is within the NFC communications range (e.g., 20 centimeters) of the communications device) and a nominal receiver gain when there is not a corresponding communications device in close proximity to the communications device (e.g., when the counterpart communications device is out of the NFC communications range (e.g., 20 centimeters) of the communications device). For example, the detuning condition quantification element calculates a ratio between a receiver gain when the counterpart communications device is within a predefined communications range of the communications device and a nominal receiver gain when there is no corresponding communications device within, for example, at least 10 times of the predefined communications range. In some embodiments, the detuning condition quantification element quantifies a system detuning condition related to the communications device based on the transmission output power information related to the communications device and the RSSI at the communications device.

In some embodiments, the detuning condition quantification element 266 quantifies a transmitter/receiver detuning condition in the inductively coupled communications system 100 based on the transmitter power information from the sensor 126 and the value of the RSSI from the RSSI sensor 128. The combination of the transmitter power information and the value of the RSSI can provide information for the field strength, H, of inductive coupling (and in turn an estimate of the distance between the communications device 102 and the counterpart communications device 104), and an estimate of the transmitter/receiver detuning condition.

In some embodiments, the control unit 216 is configured to perform multiple quantifications of a detuning condition related to the communications device 102 under different configurations of the communications device. In an example operation of the control unit, the detuning condition quantification element 266 quantifies a first detuning condition in response to information that corresponds to transmission current, voltage, or power generated in response to a first configuration of the communications device. The configuration adjustment element 262 adjusts the first configuration of the communications device into a second configuration in response to the clock signal from the clock generation circuit 114. The information obtaining element 264 obtains information that corresponds to transmission current or power generated in response to the second configuration. The detuning condition quantification element quantifies a second detuning condition in response to the obtained information. In some embodiments, the detuning condition quantification element detects a change in the detuning condition related to the communications device.

Figure 3:
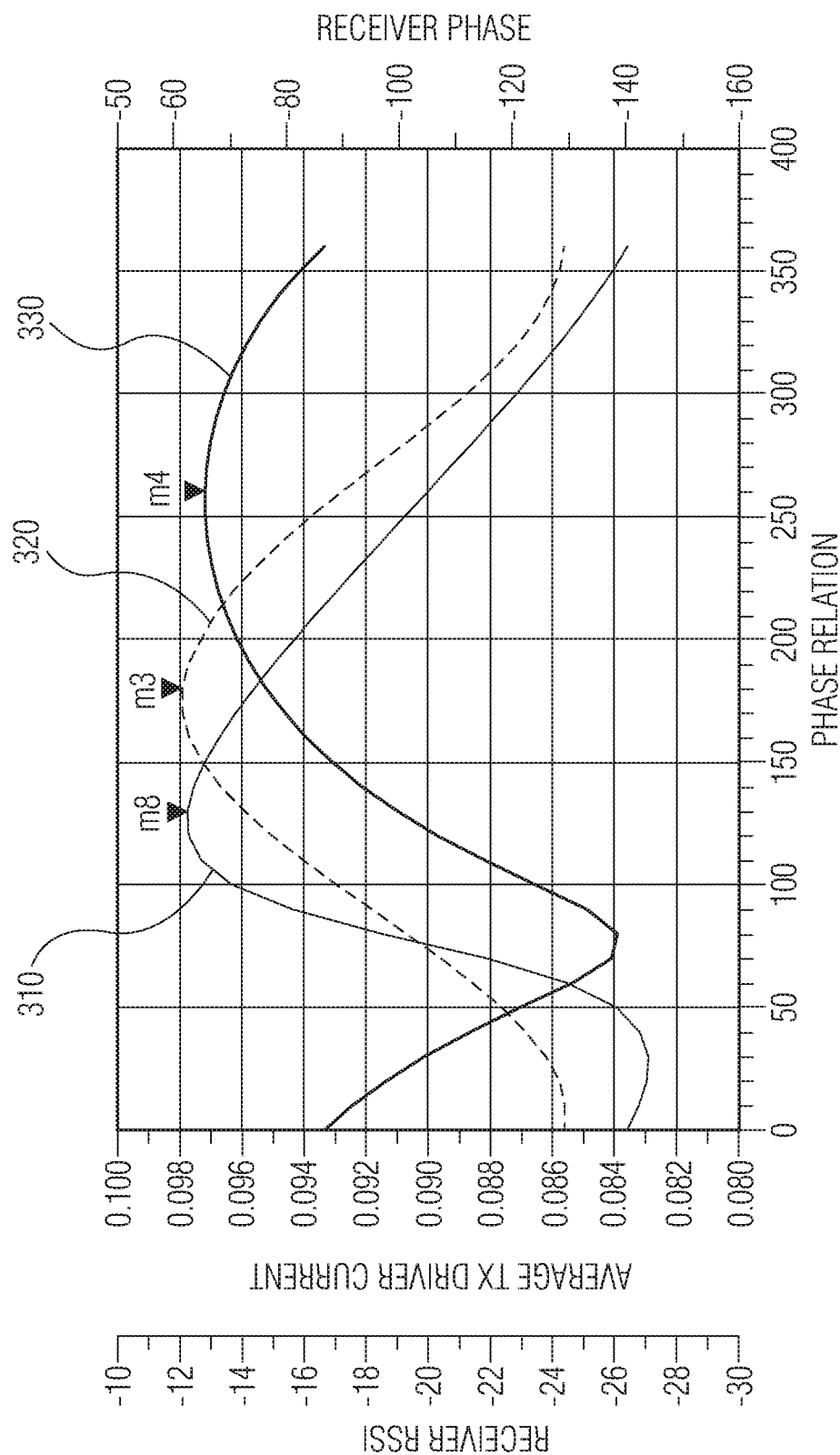
FIGS. 3 and 4 depict exemplary simulation results of a phase sweep in which a phase relation between an analog transmitter driver of the communications device depicted in FIG. 1 and the counterpart communications device depicted in FIG. 1 having a first coupling factor is adjusted.
Figure 4:
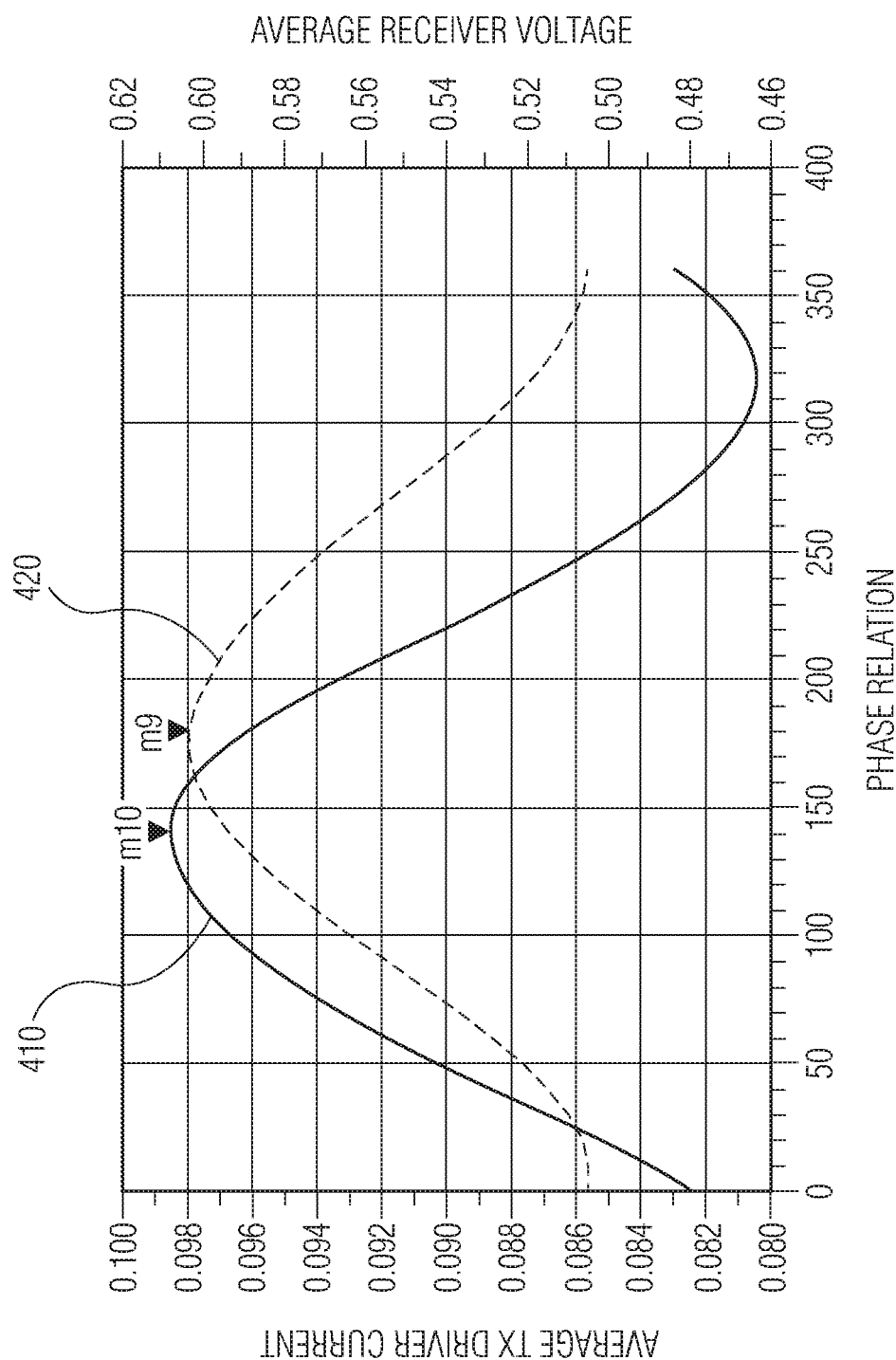

FIGS. 3 and 4 depict exemplary simulation results of a phase sweep in which the phase relation between the analog transmitter driver 108 of the communications device 102 depicted in FIG. 1 and the counterpart communications device 104 depicted in FIG. 1 having a first coupling factor is adjusted. In FIGS. 3 and 4, the phase relation between the analog transmitter driver of the communications device 102 and the counterpart communications device is swept from 0 degree to 360 degree for a coupling factor of 0.1. The coupling factor is a value between 0 and 1 in which 1 expresses perfect coupling, i.e. all flux generated by the counterpart communications device penetrates the receiver coil of the communications device and 0 expresses that transmitter and receiver coils are independent of each other. Specifically, FIG. 3 depicts a curve 310 of a receiver phase of the communications device, a curve 320 of the average transmitter driver current (in Ampere (A)), and a curve 330 of the received power at the communications device (receiver RSSI). In FIG. 3, the peak of the receiver phase is at around 120 degree (represented by marker "m8") and the minimum of the receiver phase is at around 30 degree. The peak of the average transmitter driver current is at 180 degree (represented by marker "m3") and the minimum of the average transmitter driver current is at 0 degree. The peak for the receiver RSSI is at 260 degree (represented by marker "m4") and the minimum of the receiver RSSI is at around 80 degree. FIG. 4 depicts and a curve 410 of the average receiver voltage (in volt (v)) and a curve 420 of the average transmitter driver current (in Ampere (A)). In FIG. 4, the peak of the average receiver voltage is at around 140 degree (represented by marker "m10") and the minimum of the average transmitter driver current is at around 320 degree. The peak of the average transmitter driver current is at 180 degree (represented by marker "m9") and the minimum of the average transmitter driver current is at 0 degree.

Figure 5:
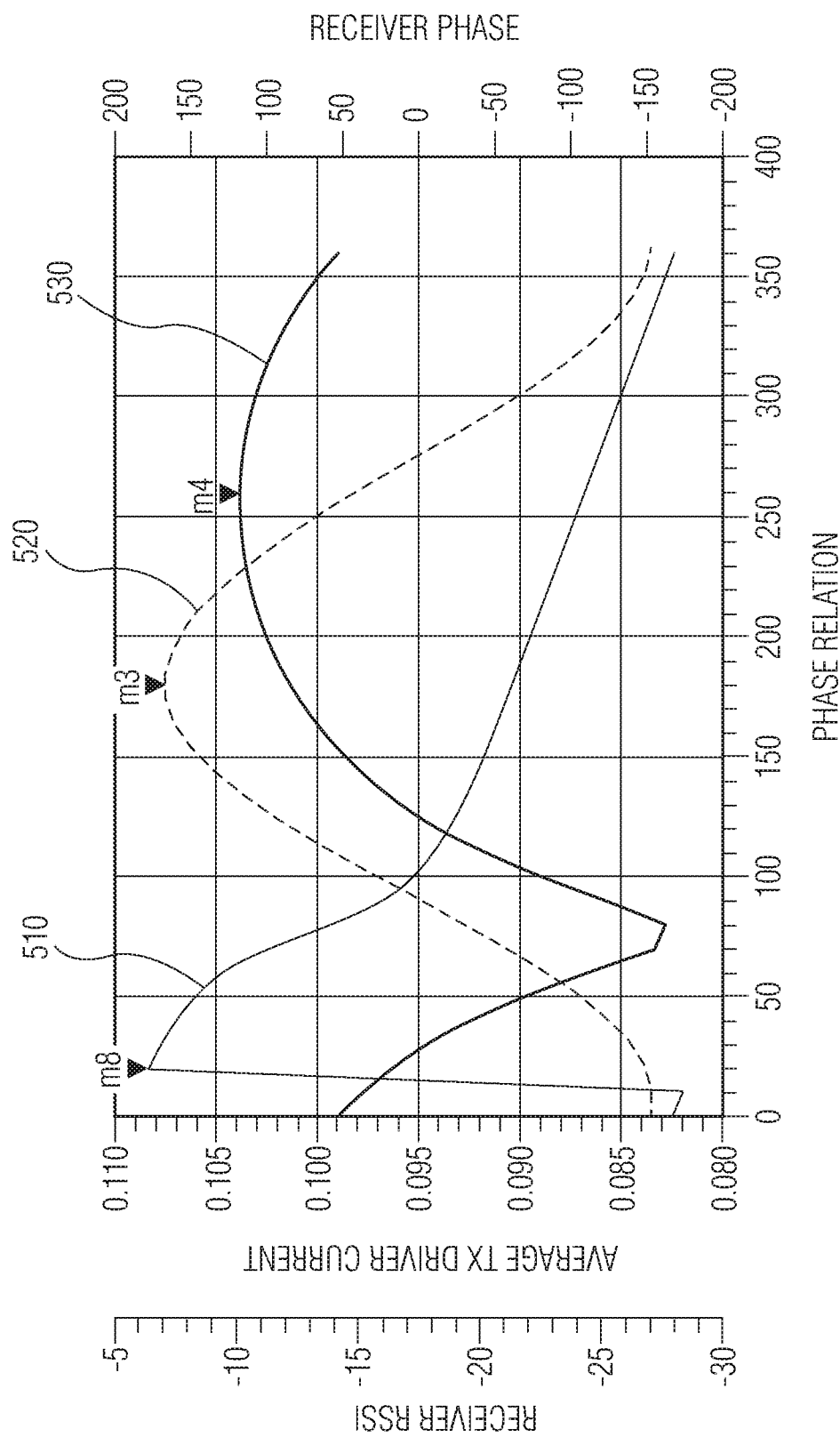
FIGS. 5 and 6 depict exemplary simulation results of a phase sweep in which the phase relation between an analog transmitter driver of the communications device depicted in FIG. 1 and the counterpart communications device depicted in FIG. 1 having a second coupling factor is adjusted.
Figure 6:
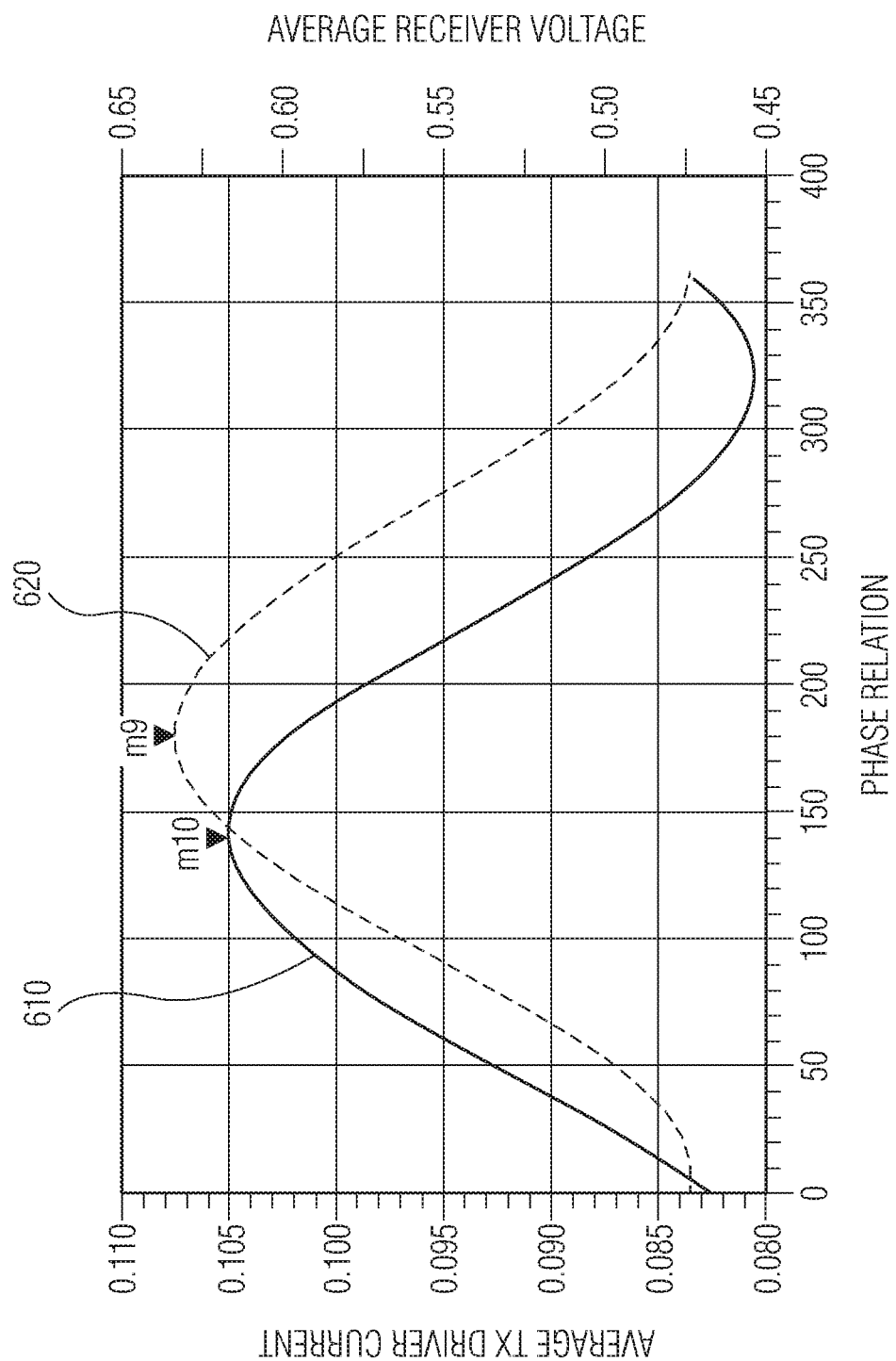

FIGS. 5 and 6 depict exemplary simulation results of a phase sweep in which the phase relation between the analog transmitter driver 108 of the communications device 102 depicted in FIG. 1 and the counterpart communications device 104 depicted in FIG. 1 having a second coupling factor is adjusted. In FIGS. 5 and 6, the phase relation between the analog transmitter driver of the communications device 102 and the counterpart communications device is swept from 0 degree to 360 degree for a coupling factor of 0.2. Specifically, FIG. 5 depicts a curve 510 of a receiver phase of the communications device, a curve 520 of the average transmitter driver current (in Ampere (A)), and a curve 530 of the received power at the communications device (receiver RSSI). In FIG. 5, the peak of the receiver phase is at around 25 degree (represented by marker "m8") and the minimum of the receiver phase is at around 10 degree. The peak of the average transmitter driver current is at 180 degree (represented by marker "m3") and the minimum of the average transmitter driver current is at 0 degree. The peak for the receiver RSSI is at 260 degree (represented by marker "m4") and the minimum of the receiver RSSI is at around 80 degree. FIG. 6 depicts and a curve 610 of the average receiver voltage (in volt (v)) and a curve 620 of the average transmitter driver current (in Ampere (A)). In FIG. 6, the peak of the average receiver voltage is at around 140 degree (represented by marker "m10") and the minimum of the average transmitter driver current is at around 320 degree. The peak of the average transmitter driver current is at 180 degree (represented by marker "m9") and the minimum of the average transmitter driver current is at 0 degree. Based on the simulation results depicted in FIGS. 3-6, the amplitude ratio between the minimum of the average transmitter driver current and the maximum of the average transmitter driver current is 115 when the coupling factor is 0.1 and 1.29 for when the coupling factor is 0.2. Similarly, based on the simulation results depicted in FIGS. 3-6, the amplitude ratio between the average receiver voltage and the average transmitter driver current is 6.2 when the coupling factor is 0.1 and 5.7 when the coupling factor is 0.2. The absolute RX voltage, the average transmitter driver current, and their ratios can be used to estimate a detuning condition and/or a change of a detuning condition.

Figure 7:
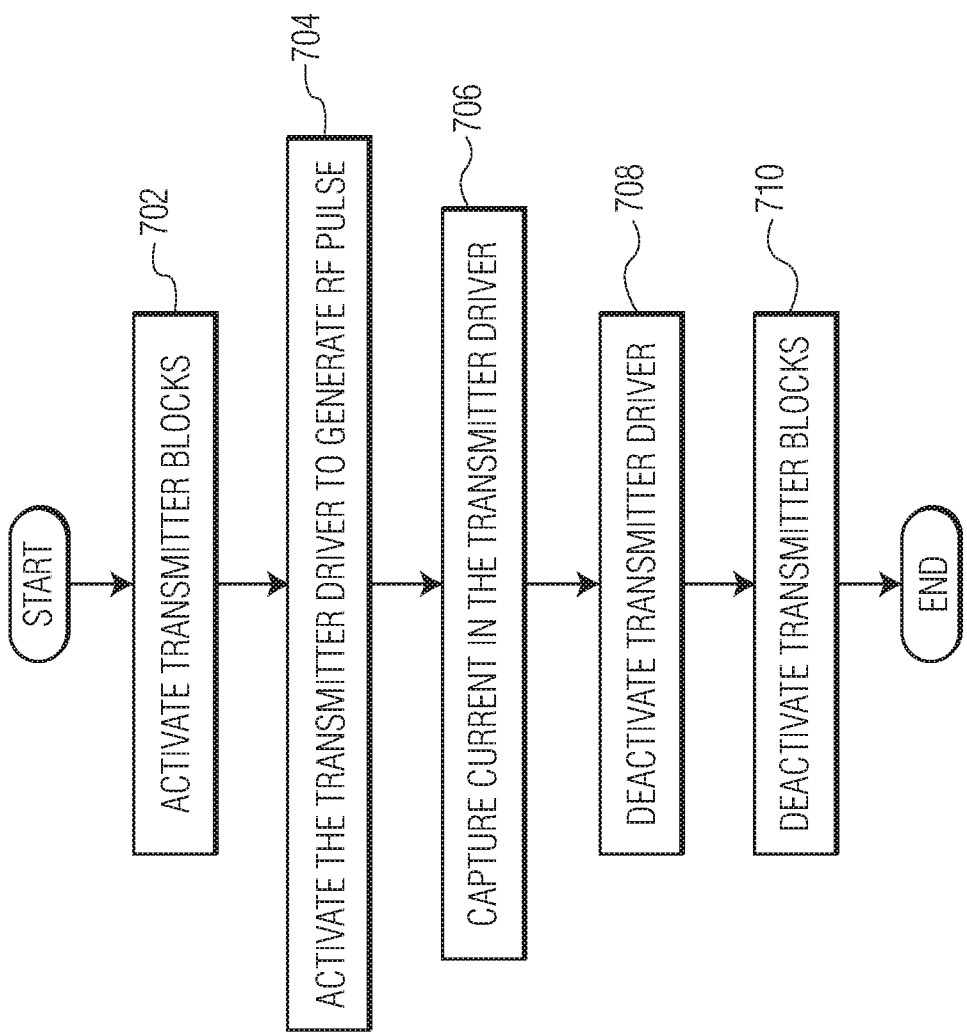
FIG. 7 is a process flow diagram of a method for accessing the transmitter current within the communications device depicted in FIG. 1.

In some embodiments, the control unit 116 of the communications device 102 depicted in FIG. 1 enables a sequence of steps to activate the analog transmitter driver 108 and other components of the transmitter section of the communications device 102 to execute the quantification of a transmitter detuning condition. FIG. 7 is a process flow diagram of a method for accessing the transmitter current within the communications device depicted in FIG. 1. At block 702, transmitter blocks (e.g., transmitter phase-locked loop (PLL) and transmitter supply) are activated. For example, transmitter biasing is enabled, transmitter PLL is started and settled, and the transmitter supply is setup. At block 704, the transmitter driver is activated and an RF pulse is generated. At block 706, the transmitter current is captured in the transmitter driver. At block 708, the transmitter driver is deactivated. At block 710, transmitter blocks (e.g., transmitter PLL and transmitter supply) are deactivated.

Figure 8:
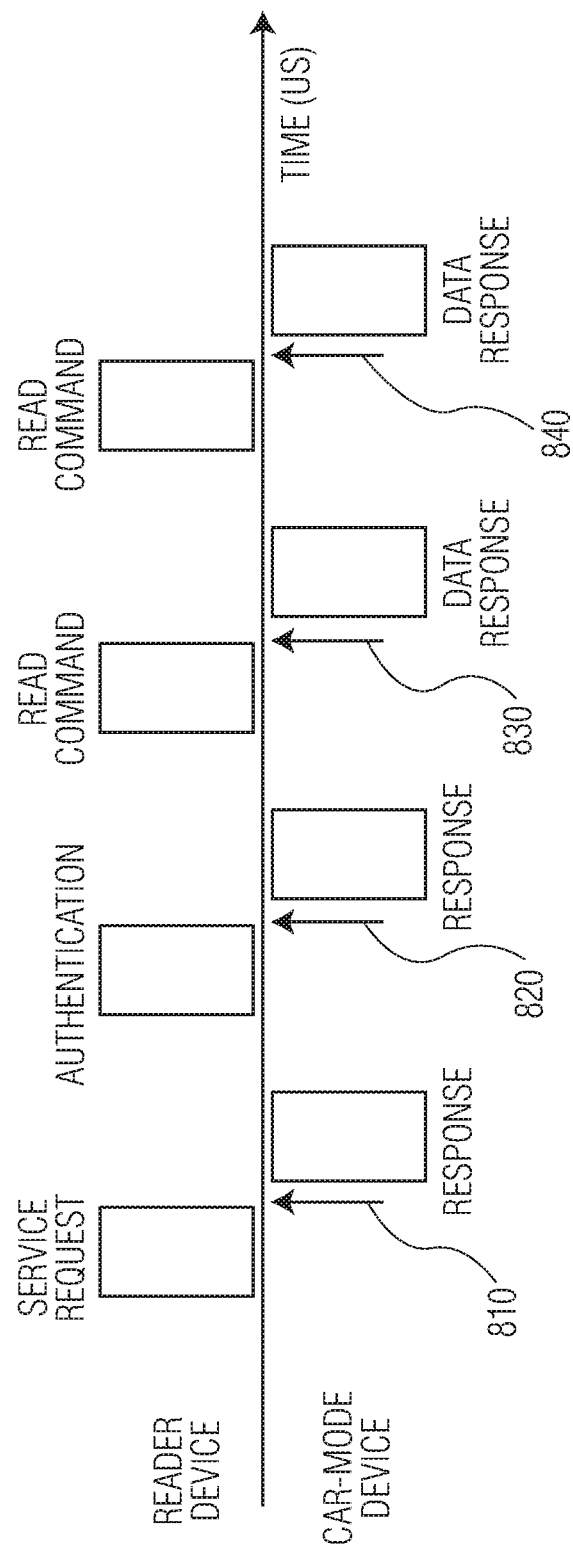
FIG. 8 depicts a sequence of commands received at the communications device depicted in FIG. 1 and a sequence of responses transmitted to the communications device during a transaction.

In some embodiments, when the communications device 102 is in reader mode, the quantification of a detuning condition is performed continuously as the communications device actively generates the RF field. In some embodiments, when the communications device is in card mode, the quantification of a detuning condition is performed intermittently to a transaction, based on a time-out and/or after the RF field is activated. FIG. 8 depicts a sequence of commands received at the communications device depicted in FIG. 1 at reader-mode and a sequence of responses transmitted to the communications device by the counterpart communications device 104 depicted in FIG. 1 during a transaction. In the course of the transaction (e.g., a payment transaction), the quantification of a detuning condition may be performed immediately before transmitting a response message to the reader device, as represented by the respective arrows 810, 820, 830, and 840.

Figure 9:
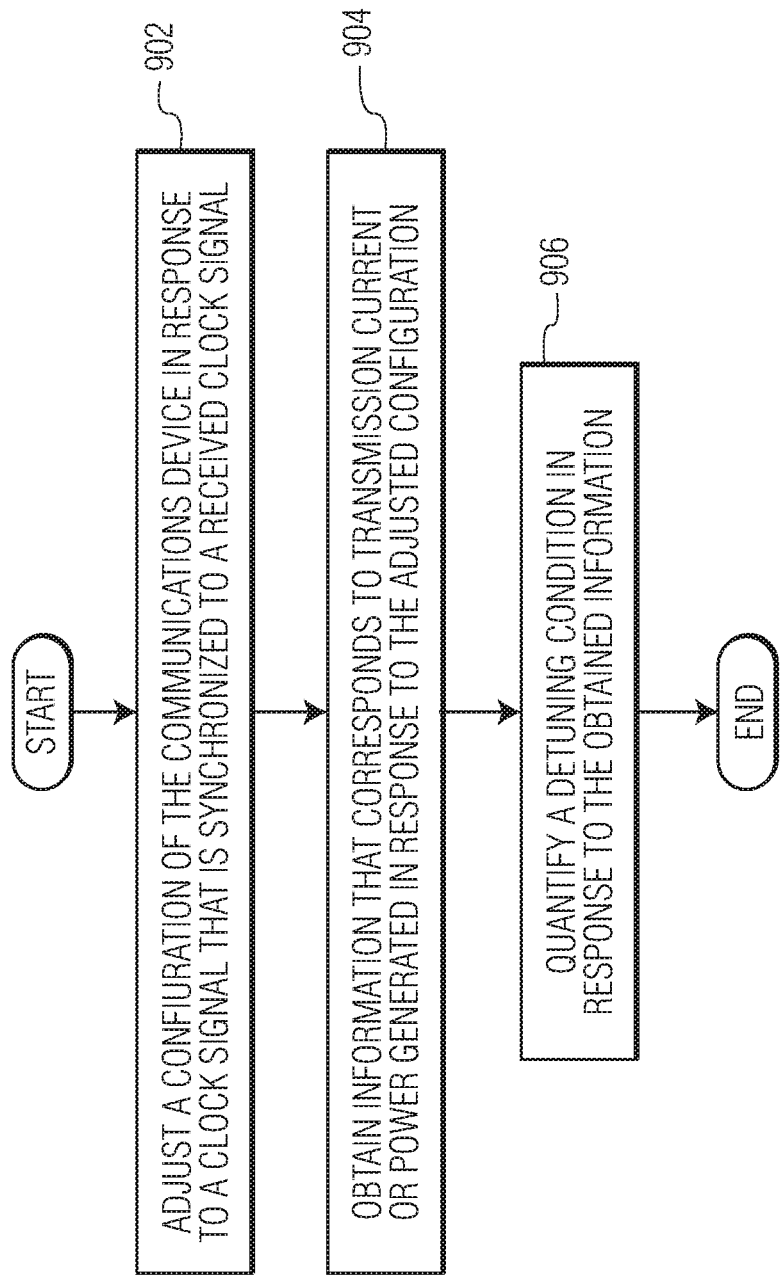
FIG. 9 is a process flow diagram of a method for operating a communications device that communicates via inductive coupling in accordance with an embodiment of the invention.

FIG. 9 is a process flow diagram of a method for operating a communications device that communicates via inductive coupling in accordance with another embodiment of the invention. At block 902, a configuration of the communications device is adjusted in response to a clock signal that is synchronized to a received clock signal. At block 904, information that corresponds to transmission current or power generated is obtained in response to the adjusted configuration. At block 906, a detuning condition is quantified in response to the obtained information. The communications device may be the same or similar to the communications device 102 depicted in FIG. 1.

Figure 10:
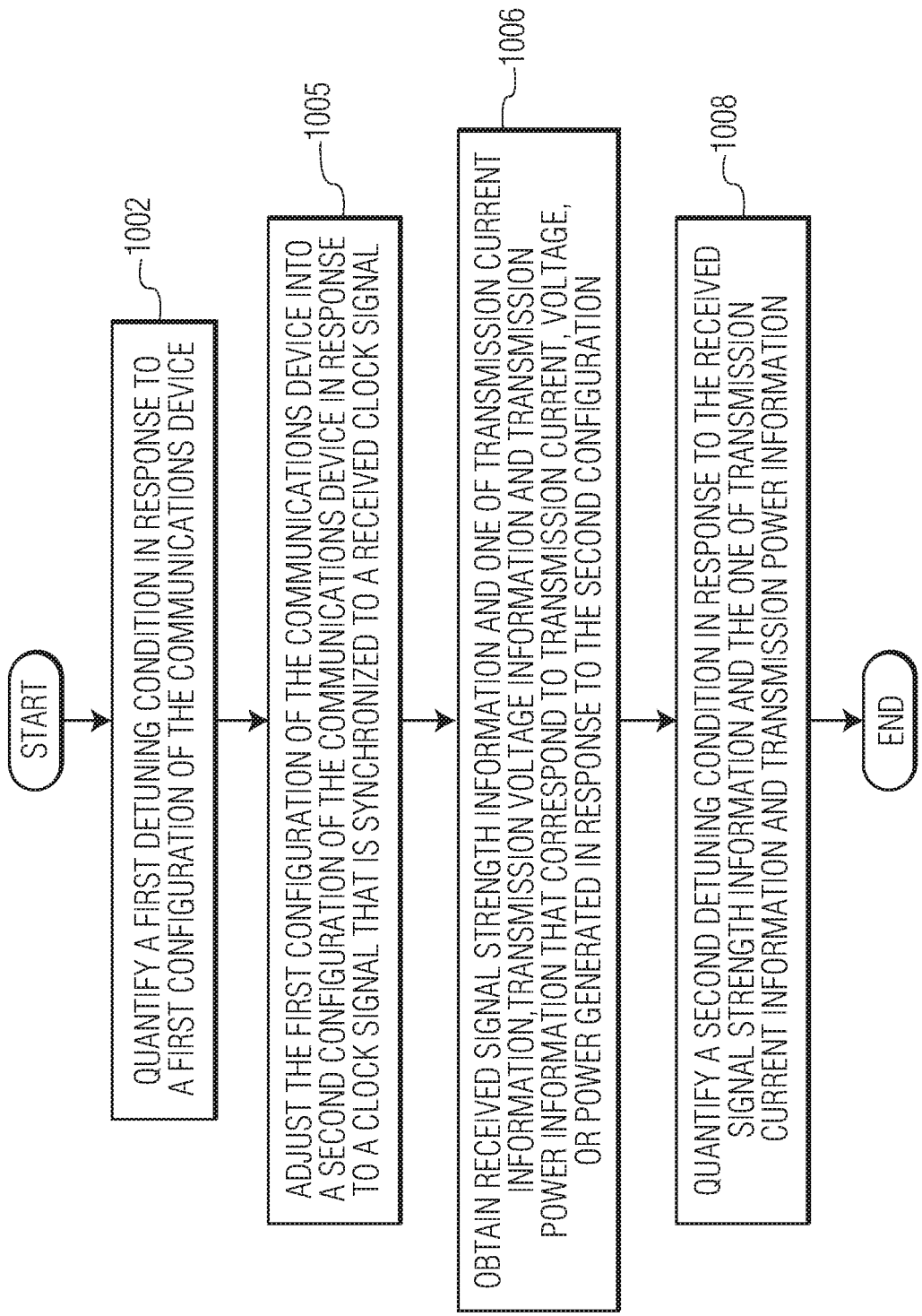
FIG. 10 is a process flow diagram of a method for operating a communications device that communicates via inductive coupling in accordance with another embodiment of the invention.

FIG. 10 is a process flow diagram of a method for operating a communications device that communicates via inductive coupling in accordance with another embodiment of the invention. At block 1002, a first detuning condition is quantified in response to a first configuration of the communications device. At block 1004, the first configuration of the communications device is adjusted into a second configuration of the communications device in response to a clock signal that is synchronized to a received clock signal. At block 1006, received signal strength information and one of transmission current information, transmission voltage information, and transmission power information that correspond to transmission current, voltage, or power generated in response to the second configuration is obtained. At block 1008, a second detuning condition is quantified in response to the received signal strength information and the one of transmission current information and transmission power information. The communications device may be the same or similar to the communications device 102 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a communications device that communicates via inductive coupling, the method comprising:
    adjusting a configuration of the communications device in response to a clock signal that is synchronized to a received clock signal;
    obtaining information that corresponds to transmission current or power generated in response to the adjusted configuration; and
    quantifying a detuning condition as a transmitter impedance ratio that indicates a communications performance of the communications device with respect to a corresponding counterpart communications device in response to the obtained information, wherein the transmitter impedance ratio is between a first transmitter impedance when the corresponding counterpart communications device is within a predefined communications range of the communications device and a second transmitter impedance when there is no corresponding communications device within the predefined communications range of the communications device.

2. The method of claim 1, wherein the configuration of the communications device comprises at least one of:
    a phase configuration of the communications device; and
    an amplitude or power configuration of a transmitter of the communications device.

3. The method of claim 1, wherein the obtained information comprises at least one of:
    transmission current information;
    transmission voltage information;
    transmission power information; and
    received signal strength information.

4. The method of claim 3, wherein quantifying the detuning condition in response to the obtained information comprises quantifying the detuning condition based on the received signal strength information and at least one of the transmission current information, the transmission voltage information, and the transmission power information.

5. The method of claim 1, further comprising quantifying a first detuning condition in response to information that corresponds to transmission current, voltage, or power generated in response to the configuration of the communications device.

6. The method of claim 1, further comprising detecting a change in the detuning condition.

7. The method of claim 1, wherein adjusting the configuration of the communications device in response to the clock signal that is synchronized to the received clock signal comprises adjusting the configuration of the communications device from a first threshold to a second threshold in response to the clock signal that is synchronized to the received clock signal.

8. The method of claim 7, wherein adjusting the configuration of the communications device from the first threshold to the second threshold in response to the clock signal that is synchronized to the received clock signal comprises at least one of:
    sweeping a phase relation between a carrier phase and a transmission phase from the first threshold to the second threshold in response to the clock signal that is synchronized to the received clock signal; and
    sweeping a transmission signal amplitude from the first threshold to the second threshold in response to the clock signal that is synchronized to the received clock signal.

9. The method of claim 1, further comprising adjusting a transmitter configuration of the communications device in response to the quantified detuning condition.

10. The method of claim 1, wherein quantifying the detuning condition in response to the obtained information comprises quantifying the detuning condition based on the obtained information before transmitting a response message.

11. A communications device that communicates via inductive coupling, the communications device comprising:

a configuration adjustment element configured to adjust a configuration of the communications device in response to a clock signal that is synchronized to a received clock signal;

an information obtaining element configured to obtain information that corresponds to transmission current or power generated in response to the adjusted configuration; and a detuning condition quantification element configured to quantify a detuning condition as a transmitter impedance ratio that indicates a communications performance of the communications device with respect to a corresponding counterpart communications device in response to the obtained information, wherein the transmitter impedance ratio is between a first transmitter impedance when the corresponding counterpart communications device is within a predefined communications range of the communications device and a second transmitter impedance when there is no corresponding communications device within the predefined communications range of the communications device.

12. The communications device of claim 11, wherein the configuration of the communications device comprises at least one of:

a phase configuration of the communications device; and an amplitude configuration or power of a transmitter of the communications device.

13. The communications device of claim 11, wherein the obtained information comprises at least one of:

transmission current information;

transmission voltage information;

transmission power information; and received signal strength information.

14. The communications device of claim 13, wherein the detuning condition quantification element is further configured to quantify the detuning condition based on the received signal strength information and at least one of the transmission current information, the transmission voltage information, and the transmission power information.

15. The communications device of claim 11, wherein the detuning condition quantification element is further configured to quantify a first detuning condition in response to information that corresponds to transmission current, voltage, or power generated in response to the configuration of the communications device.

16. The communications device of claim 11, wherein the detuning condition quantification element is further configured to detect a change in the detuning condition.

17. The communications device of claim 11, wherein the configuration adjustment element is further configured to adjust the configuration of the communications device from a first threshold to a second threshold in response to the clock signal that is synchronized to the received clock signal.

18. The communications device of claim 17, wherein the configuration adjustment element is further configured to:

sweep a phase relation between a carrier phase and a transmission phase from the first threshold to the second threshold in response to the clock signal that is synchronized to the received clock signal; and sweep a transmission signal amplitude from the first threshold to the second threshold in response to the clock signal that is synchronized to the received clock signal.

19. The communications device of claim 11, wherein the detuning condition quantification element is further configured to quantify the detuning condition based on the obtained information before transmitting a response message.

20. A method for operating a communications device that communicates via inductive coupling, the method comprising:

measuring a first detuning condition that indicates a communications performance of the communications device with respect to a corresponding counterpart communications device in response to a first configuration of the communications device;

adjusting the first configuration of the communications device into a second configuration of the communications device in response to a clock signal that is synchronized to a received clock signal;

obtaining received signal strength information and one of transmission current information, transmission voltage information, and transmission power information that correspond to transmission current, voltage, or power generated in response to the second configuration; and quantifying a second detuning condition as a transmitter impedance ratio in response to the received signal strength information and the one of transmission current information and transmission power information, wherein the transmitter impedance ratio is between a first transmitter impedance when the corresponding counterpart communications device is within a predefined communications range of the communications device and a second transmitter impedance when there is no corresponding communications device within the predefined communications range of the communications device.

* * * * *